(12) United States Patent
Buytenhek et al.

(10) Patent No.: US 11,245,753 B2
(45) Date of Patent: Feb. 8, 2022

(54) USER SPACE REDIRECT OF PACKET TRAFFIC

(71) Applicant: Fastly, Inc., San Francisco, CO (US)

(72) Inventors: Lennert Buytenhek, San Francisco, CA (US); João Taveira, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 16/544,188

(22) Filed: Aug. 19, 2019

(65) Prior Publication Data

US 2020/0059514 A1   Feb. 20, 2020

Related U.S. Application Data

(60) Provisional application No. 62/719,271, filed on Aug. 17, 2018.

(51) Int. Cl.
*H04L 29/08* (2006.01)
*H04L 12/803* (2013.01)
*H04L 12/721* (2013.01)
*H04L 29/06* (2006.01)
*H04L 29/12* (2006.01)
*H04L 12/801* (2013.01)

(52) U.S. Cl.
CPC ......... *H04L 67/1038* (2013.01); *H04L 45/66* (2013.01); *H04L 47/125* (2013.01); *H04L 47/196* (2013.01); *H04L 61/6022* (2013.01); *H04L 63/0263* (2013.01); *H04L 63/102* (2013.01); *H04L 67/1004* (2013.01); *H04L 67/1029* (2013.01)

(58) Field of Classification Search
CPC ............... H04L 67/1029; H04L 67/1004; H04L 47/196
See application file for complete search history.

(56) References Cited

U.S. PATENT DOCUMENTS

| | | | | | |
|---|---|---|---|---|---|
| 5,864,535 | A | * | 1/1999 | Basilico | H04L 29/06 370/231 |
| 6,182,139 | B1 | * | 1/2001 | Brendel | H04L 29/06 709/201 |
| 6,675,218 | B1 | * | 1/2004 | Mahler | H04L 29/06 370/229 |
| 7,475,157 | B1 | * | 1/2009 | Tormasov | H04L 67/1008 709/227 |
| 7,587,510 | B1 | * | 9/2009 | Klager | G06F 9/545 709/232 |
| 7,729,368 | B2 | * | 6/2010 | Saha | H04L 69/16 370/412 |
| 7,783,849 | B2 | * | 8/2010 | Devendran | G06F 21/79 711/162 |
| 8,850,002 | B1 | * | 9/2014 | Dickinson | H04L 67/1002 709/224 |

(Continued)

*Primary Examiner* — Lashonda T Jacobs

(57) ABSTRACT

Enhanced packet redirect capabilities are disclosed herein for draining traffic to a server. In an implementation, a server in an infrastructure service receives a packet from a stateless load balancer. The packet may comprise a request for content. A user space program on the server determines whether a connection identified in the packet belongs to the server. If the connection belongs to the server, the user space program handles the request for the content. If not, the server forwards the packet to a secondary server in the infrastructure service. The secondary server, to which the connection may belong, can then handle the request.

20 Claims, 10 Drawing Sheets

(56) References Cited

U.S. PATENT DOCUMENTS

| | | | | |
|---|---|---|---|---|
| 8,998,544 B1* | 4/2015 | Higgins | | H04L 67/1029 |
| | | | | 409/206 |
| 9,379,982 B1* | 6/2016 | Krishna | | H04L 47/125 |
| 9,560,126 B2* | 1/2017 | van Bemmel | | H04L 67/1034 |
| 9,569,318 B2* | 2/2017 | Ara jo | | G06F 11/2048 |
| 10,034,201 B2* | 7/2018 | Pallas | | H04W 28/08 |
| 10,084,703 B2* | 9/2018 | Kumar | | H04L 49/3009 |
| 10,375,159 B2* | 8/2019 | McMullen | | H04L 67/1023 |
| 10,412,157 B2* | 9/2019 | Thirumurthi | | H04L 49/35 |
| 10,511,534 B2* | 12/2019 | Pfister | | H04L 47/125 |
| 2005/0165885 A1* | 7/2005 | Wong | | H04L 67/1002 |
| | | | | 709/201 |
| 2008/0175258 A1* | 7/2008 | Saha | | H04L 49/90 |
| | | | | 370/412 |
| 2009/0222583 A1* | 9/2009 | Josefsberg | | H04L 67/1038 |
| | | | | 709/245 |
| 2009/0240874 A1* | 9/2009 | Pong | | G06F 12/0223 |
| | | | | 711/105 |
| 2011/0185065 A1* | 7/2011 | Stanisic | | H04L 67/1002 |
| | | | | 709/226 |
| 2012/0124641 A1* | 5/2012 | Hegge | | H04L 63/306 |
| | | | | 726/1 |
| 2014/0258705 A1* | 9/2014 | Roskind | | H04L 67/2814 |
| | | | | 713/150 |
| 2016/0112503 A1* | 4/2016 | Yang | | H04L 12/6418 |
| | | | | 709/223 |
| 2017/0063786 A1* | 3/2017 | Pettit | | H04L 69/22 |
| 2017/0085486 A1* | 3/2017 | Chung | | H04L 41/042 |
| 2017/0126797 A1* | 5/2017 | Frid | | H04L 43/0817 |
| 2017/0295264 A1* | 10/2017 | Touitou | | H04L 69/162 |
| 2019/0229903 A1* | 7/2019 | Balasubramanian | | |
| | | | | H04L 9/0861 |
| 2020/0021479 A1* | 1/2020 | Rao | | H04L 41/0206 |
| 2020/0120015 A1* | 4/2020 | Boucadair | | H04L 12/66 |

* cited by examiner

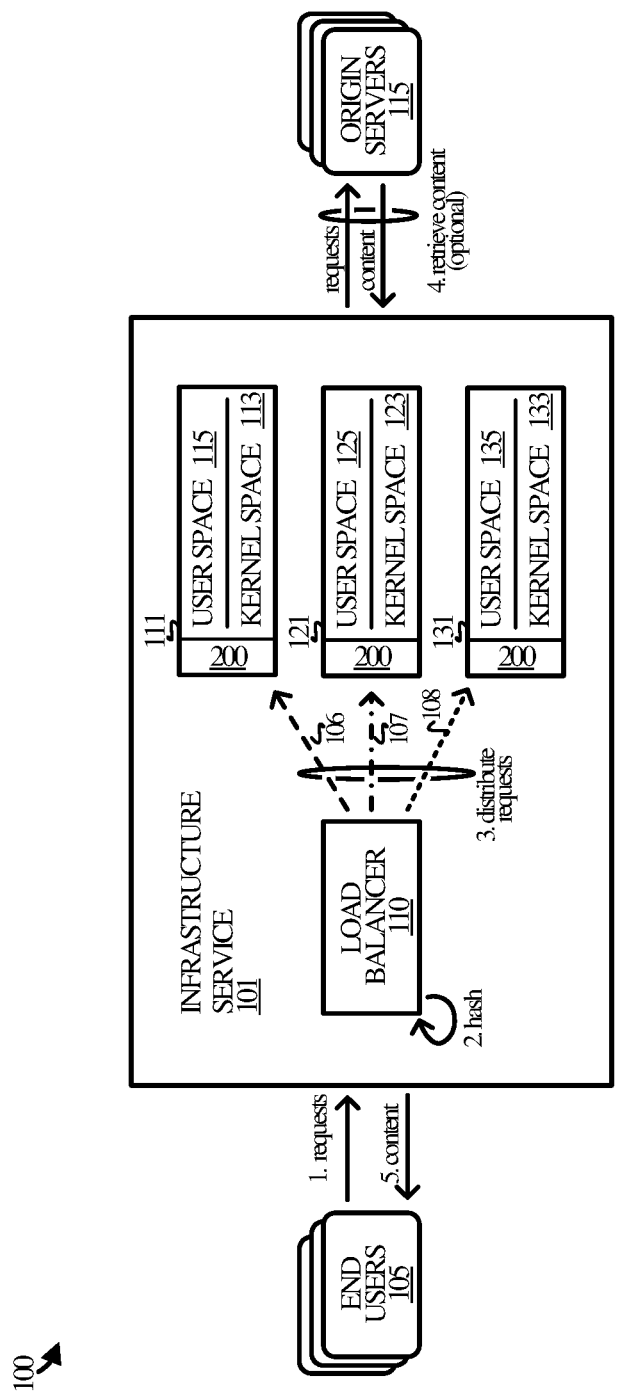

USER SPACE REDIRECT OF PACKET TRAFFIC

RELATED APPLICATIONS

This application is related to—and claims priority to—U.S. Provisional Patent Application 62/719,271, entitled "USER SPACE REDIRECT OF PACKET TRAFFIC," and filed on Aug. 17, 2018, which is hereby incorporated by reference in its entirety.

TECHNICAL FIELD

Aspects of the disclosure are related to the field of computing and communication networks and, more particularly, to the enhanced handling of failovers and load balancing.

BACKGROUND

Content delivery networks, edge cloud platforms, and other types of computing and communications infrastructure utilize load balancers to distribute traffic across servers. A typical load balancer receives incoming traffic from end users and directs it to various servers in accordance with a load balancing algorithm. The algorithm generally ensures that existing connections made between end users and servers are maintained.

A given server may need to be taken out of service from time to time. When such a need arises, a stateful load balancer can redirect traffic to other servers, while maintaining the connections to the server being drained. However, a stateless load balancer can only redirect traffic away from the server being drained, since it does not have knowledge of the underlying connections. This can have the adverse effect of disrupting the traffic flow between end users and the target server over connections that were previously established.

One technique to mitigate such disruptions involves the other servers inspecting their incoming packet traffic for connections that do not belong to them. If a given packet identifies a connection that is neither new nor already known to a server, the server forwards the packet to its previous owner, e.g. the server being drained of traffic. In this manner, old connections can be maintained to the old server while new connections can be made with the new server. Over time, the old server will be drained of traffic, allowing for maintenance, repairs, upgrades, or whatever other need prompted it to be taken out of service in the first place.

The task of inspecting a packet for its connection and determining whether it is new or known falls on kernel space code in the new server. This technique requires the kernel to maintain a list of all ongoing connections between end users and the server so that, when a new packet arrives, a determination can be made whether it is new or known.

Such tasks are not possible for connection protocols that are implemented in user space. With connection protocols that are implemented in user space, the connections being made between end users and a proxy in user space are not known to the kernel. This means that the kernel cannot inspect and redirect packets in the interest of maintaining the existing connections to a server being drained of traffic.

Overview

Technology is disclosed herein for handling server failovers, load balancing, and the like, in the context of computing and communications networks. In an implementation, user space code in a server makes the determination of whether to keep an incoming packet or forward it to another server. The server receives a packet from a stateless load balancer in, for example, a content delivery network. The packet may comprise a request for content potentially cached by the content delivery network or obtainable from one or more origin servers.

A user space program on the server determines whether a connection identified in the packet belongs to the server. If so, the user space program handles the request for the content, which may include passing the request to another application capable of processing its payload. If the connection does not belong to the server, then the user space program forwards the packet a secondary server in the network. In this manner, the secondary server can be gracefully drained of traffic and taken out of service for a period of time.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 3A-3B illustrate an operational scenario in an implementation.

DETAILED DESCRIPTION

Technology disclosed herein relates to enhanced redirect solutions for infrastructure services such as content delivery networks, cloud edge platforms, and other computing and communications environments. In various implementations, user space code is utilized to redirect packet traffic, thereby allowing servers to be gracefully drained of traffic in the event of a failover scenario, load balancing, or the like.

In an exemplary implementation, a load balancer distributes packet traffic across a set of servers. The servers handle requests in the packet traffic by, among other things, establishing connections with end users. The servers may then communicate with the end user via the connections, eventually releasing the connections once requests have been satisfied.

A situation may arise necessitating that one of the servers be drained of traffic. To achieve this, the load balancer directs all incoming packet traffic away from the server and to the other servers. However, this may have the effect of disrupting the existing, ongoing connections between the identified server and end users. To mitigate these problems, a redirect process is employed by the other servers to ensure that traffic associated with the ongoing connections is redirected to the identified server.

The traffic redirect is performed in user space of the other servers. User space code in each server receives a given packet and examines it to determine if the connection identified in the packet belongs to that server. If so, the server keeps the packet and continues to process it normally, which may include passing the packet to another application on the server.

If the connection does not belong to the server, then the server forwards it to a secondary server associated with the packet. The secondary server associated with the packet may be, for example, the identified server that is being drained. In this manner, traffic associated with ongoing connections may remain with the identified server, while traffic associated with other connections may be routed to the other servers, slowly draining the identified server of all traffic so that it can be taken out of service for maintenance, upgrades, and the like.

Figure 1:
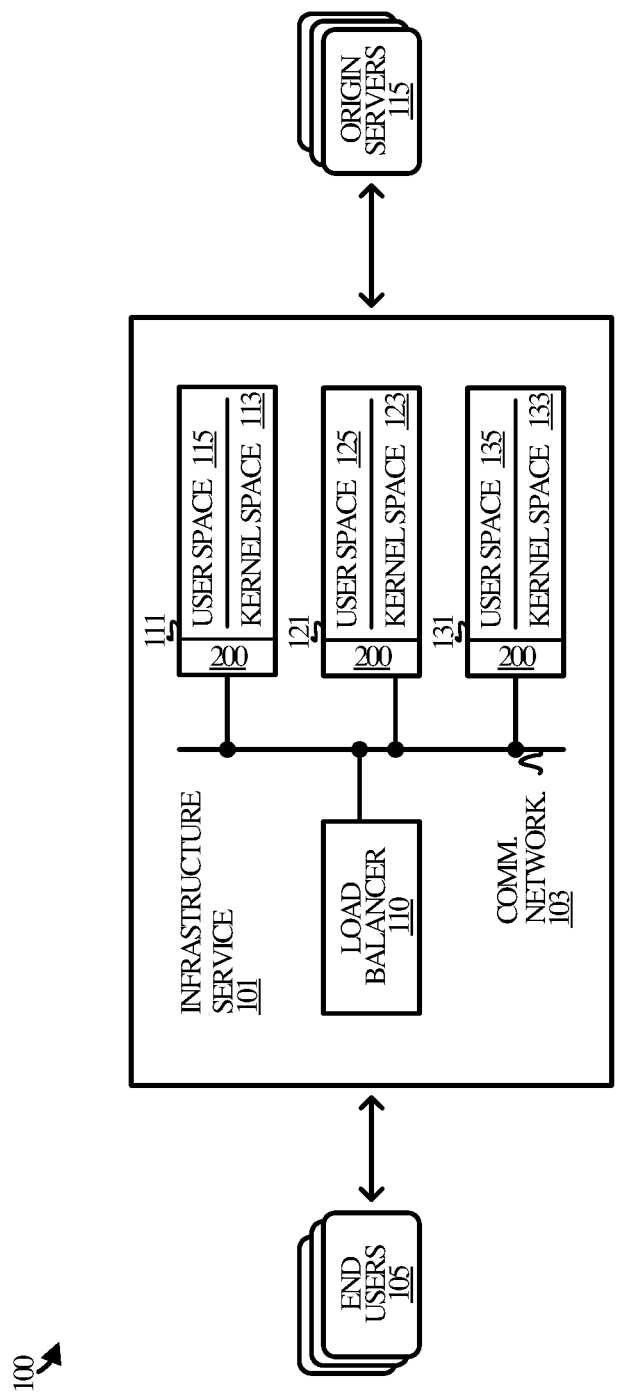
FIG. 1 illustrates an operational environment in an implementation.

Referring now to the drawings, FIG. 1 illustrates operational environment 100 in an implementation. Operational environment 100 includes infrastructure service 101, end users 105, and origin servers 115. Infrastructure service 101 is representative of a content delivery network, an edge cloud platform, or the like, and is comprised of various physical and/or virtual computing and communication elements suitable for implementing a variety of associated services. In particular, load balancer 110, server 111, server 121, and server 131 reside in infrastructure service 101 and exchange packets over communication network 103. Other equipment may be included in infrastructure service 101 but are omitted for the sake of clarity.

Figure 7:
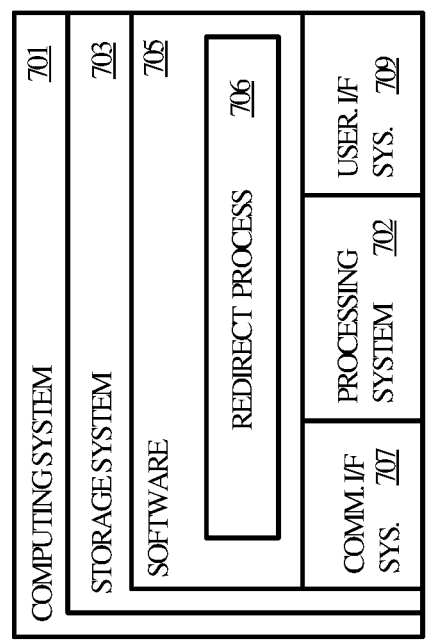
FIG. 7 illustrates a computing system suitable for implementing the various operational environments, architectures, processes, scenarios, and sequences discussed below with respect to the Figures.

Load balancer 110 is representative of any physical or virtual computing equipment capable of distributing incoming packet traffic across various servers. Load balancer 110 may be implemented on one or more computing systems, of which computing system 701 in FIG. 7 is representative. Load balancer 110 may employ, for example, a hash algorithm, a round-robin algorithm, a random (or pseudo random) algorithm, or any other type of algorithm, combination, or variation thereof, to distribute traffic to server 111, server 121, and server 131. Load balancer 110 is stateless in that it does not track connections between end users and servers.

Server 111, server 121, and server 131 are each representative of any physical or virtual server computer suitable for processing incoming requests for content from end users 105 and serving content to end users 105 in reply, of which computing system 701 is also broadly representative. Each of servers 111, 121, and 131 includes software that may be considered to execute in one of kernel space and user space, represented by kernel space 113 and user space 115, kernel space 123 and user space 125, and kernel space 133 and user space 135.

Communication network 103 is representative of any network or collection of networks (physical or virtual) over which load balancer 105 may communicate with servers 111, 121, and 131. Communication network 103 may include various elements, such as switches, routers, and cabling to connect the various elements of infrastructure service 101. The elements may communicate with each other in accordance with any suitable protocol, for example Ethernet.

End users 105 are representative of the various computing devices from which requests may originate and to which content may be served, such as consumer devices, enterprise devices, and the like. Examples include, but are not limited to, laptop and desktop computers, tablets, mobile phones, wearable devices, entertainment devices, gaming devices, other server computers, Internet of Things (IoT) devices, or any other type of end user computing device. End users 105 communicate with infrastructure service 101 over one or more public or private networks (e.g. the Internet), combination of networks, or variations thereof.

Origin servers 115, which are optional, represent the source of content that maybe be cached by infrastructure service 101 in specific implementations. Origin servers 115 may be implemented on any physical or virtual computing system, of which computing system 701 in FIG. 7 is broadly representative. Examples of content that may be cached include text, images, video, web sites, objects, applications, or any other type of data, variation, or combination thereof. Origin servers 115 also communicate with infrastructure service 101 via one or more public or private networks, combination of networks, or variations thereof.

Figure 2:
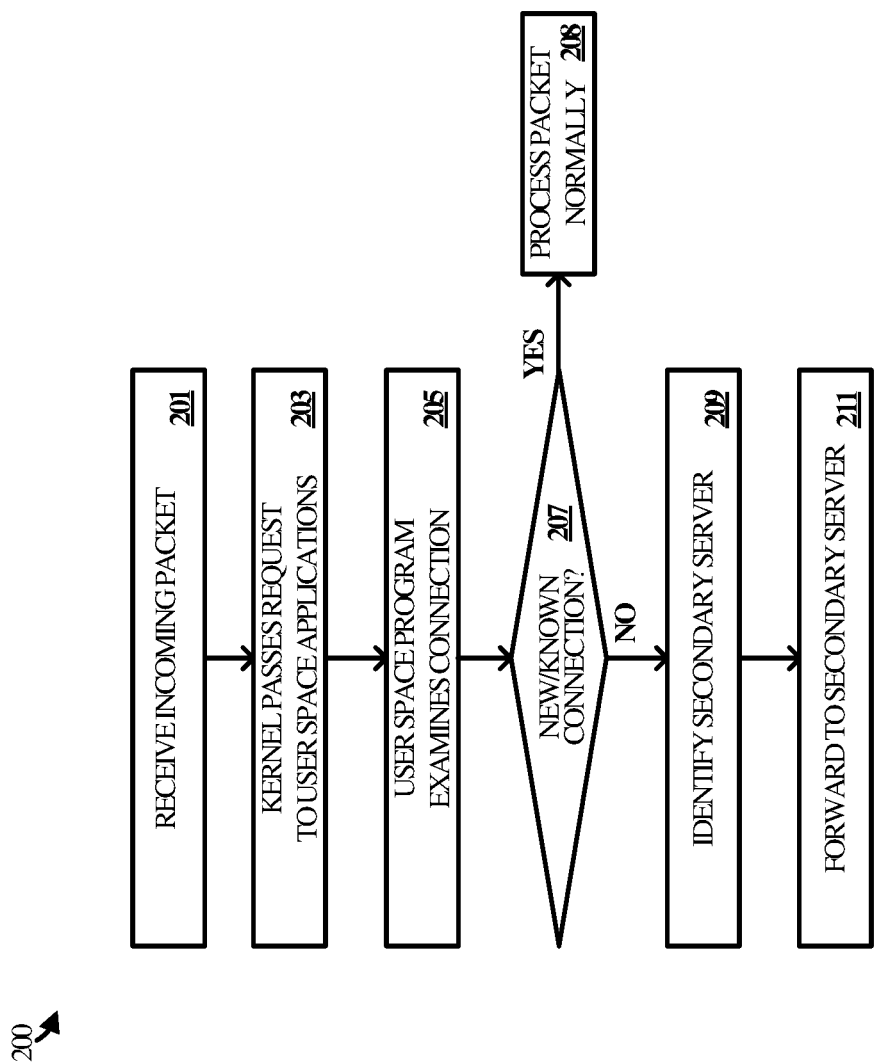
FIG. 2 illustrates a redirect process in an implementation.

Servers 111, 121, and 131 may each employ a redirect process 200 for handling incoming packet traffic from load balancer 110. Redirect process 200, which is illustrated in more detail in FIG. 2, may be implemented in program instructions in the context of any of the software applications, modules, components, or other such programming elements deployed in each server. The program instructions direct the underlying physical or virtual computing system or systems to operate as follows, referring parenthetically to the steps in FIG. 2.

To begin, a given server receives a packet from load balancer (step 201). The packet may comprise a request from an end user for content of various types, such as a web site, image, video, object, script, application, or any other type of content. Kernel space code in the server passes the request to code in user space for processing (step 203).

The user space program receives the request and examines it to identify a connection that may be included (step 205). Next, the program determines whether the connection is new or known to the server, or unknown to the server (step 207). If the connection is new or known, the program determines to keep the packet and continues processing the request normally (step 208). This may involve, for example, serving content to the end user that is stored on the server or that needs to be obtained from an origin server.

If the connection is neither new nor known, then the server proceeds to identify a secondary server to which the packet can be forwarded (step 209). The secondary server may be identified in the packet itself by an identifier of some sort, such as a network address, a media access control (MAC) address, an alias that can be translated into an address, or any other suitable identifier. The server then forwards the packet to the secondary server (step 211) so that the secondary server can process and respond to the request.

In some implementations, the user space program knows the address of the secondary server, if any, from the kernel. The kernel reads that information in the destination MAC address. If the MAC address is in the form *:AA:BB, with the primary server being A, then it means that the packet might belong to B. The kernel passes the packet to the user space program along with metadata (sometimes referred to as ancillary data) identifying the MAC address of the secondary server, i.e. *:BB:BB.

Figure 3B:
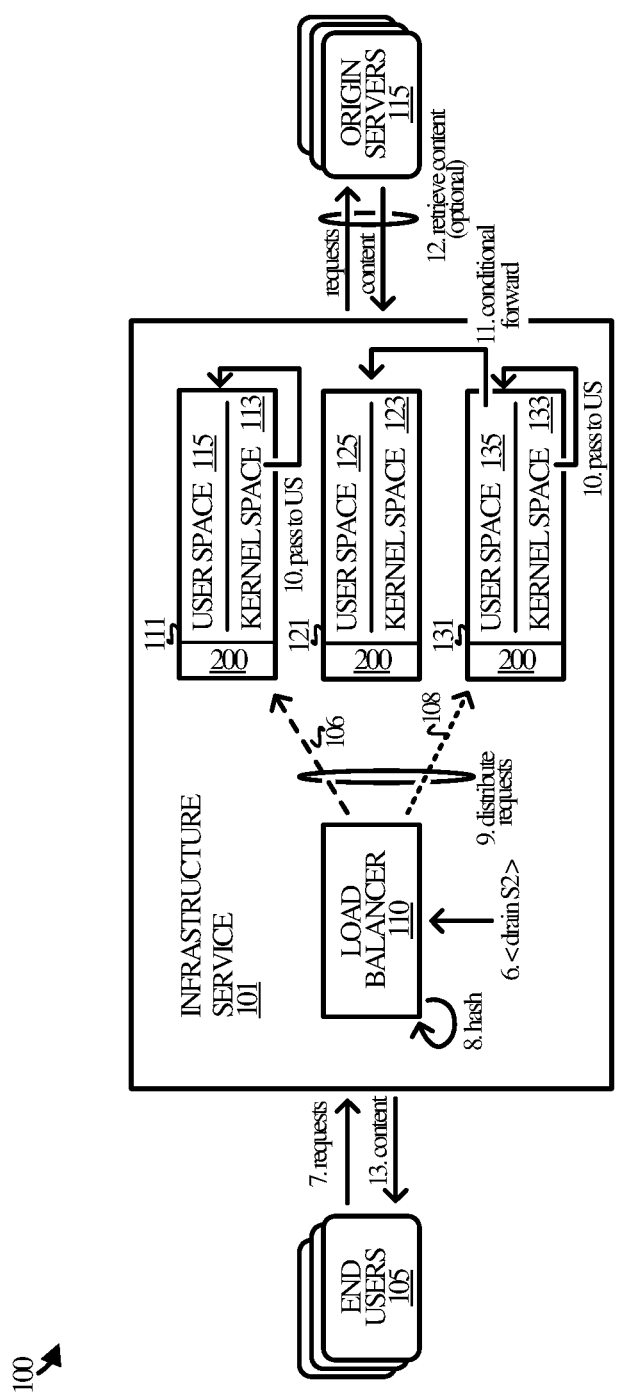

FIGS. 3A-3B illustrate Steps 1-13 of an operational scenario to further demonstrate the technical effects produced by redirect process 200 as employed by servers 111, 121, and 131. Referring to FIG. 3A, end users 105 communicate packet traffic carrying requests for content to infrastructure service 101. The packet traffic may traverse one or more networks before reaching infrastructure service 101, such as a local area network, a wide area network, an Internet service provider network, an intermediate transit network, a backhaul network, and the like.

The traffic reaches infrastructure service 101 and is processed by load balancer 110 to determine where to send each packet. Load balancer 110 may employ a hash algorithm to distribute the traffic across servers 111, 121, and 131 in a generally even fashion. However, a variety of algorithms are possible, as well as a variety of conditions under which each algorithm may run, resulting in a variety of possible distributions. In this example, the incoming packet traffic is distributed such that portion 106 reaches server 111, portion 107 reaches sever 121, and portion 108 reaches server 131.

Servers 111, 121, and 131 each process the requests in the respective portions of the packet traffic that load balancer 110 sends their way. This may include, for example, retrieving content from local storage or from origin servers 115 and sending the content to end users 105. The servers may create connections between themselves and the end users 105 in order to affect the transfer(s), and the connections may stay up for a period of time. That is, a given server may continue to communicate with a given end user for a period of time in order to complete the transfer of content to the end user.

It is assumed for exemplary purposes that the hash algorithm employed by load balancer 110 operates to keep the packets sent over a particular connection flowing to the same server that originated the connection. However, when a given server is taken out of service, the load balancer 110 may be unable to flow packets to that server. Rather, the packets may be sent to a different server that has no knowledge about the connections referenced in the packets. This can result in lost packets, delayed replies, or the like. Accordingly, servers 111, 121, and 131 each employ redirect process 200 to guard against such occurrences.

Referring to FIG. 3B, load balancer 110 receives an instruction to drain traffic from server 121. This may be to take server 121 out of service for maintenance, upgrades, repairs, decommissioning, or for any other reason for taking a server out of service. As requests continue to flow into load balancer 110, its hashing algorithm is applied to the traffic to determine where to route it. However, since server 121 will be taken out of service, the hashing algorithm directs all of the traffic to either server 111 or server 131—but not server 121.

Server 111 receives the portion 106 of the traffic directed to it by the hash algorithm, while server 131 receives the portion 108 directed to it. Each portion may include some traffic associated with connections that had been established by server 121 prior the instruction to drain it of traffic. Server 111 and server 131 both employ redirect process 200 to accommodate such traffic so that packets associated with old connections on server 121 can be redirected, while new or known connections can remain with the servers.

In server 111, it is assumed for exemplary purposes that none of the packets sent to it need to be redirected to server 121. As such, code in kernel space 113 receives each packet and passes the packet to user space 115 for further processing. In server 131, code in kernel space 133 passes the incoming packets to user space 135. Code in user space 135 examines the packets and conditionally forwards those that belong to connections associated with server 121.

All three servers may reply to requests in the packet traffic with content that is cached locally. If the content is not already cached, then the servers may retrieve the content from origin servers 115 or elsewhere (e.g. from another server in infrastructure service 101). The content may be communicated from infrastructure service 101 over the one or more networks that couple it to end users 105.

Figure 4:
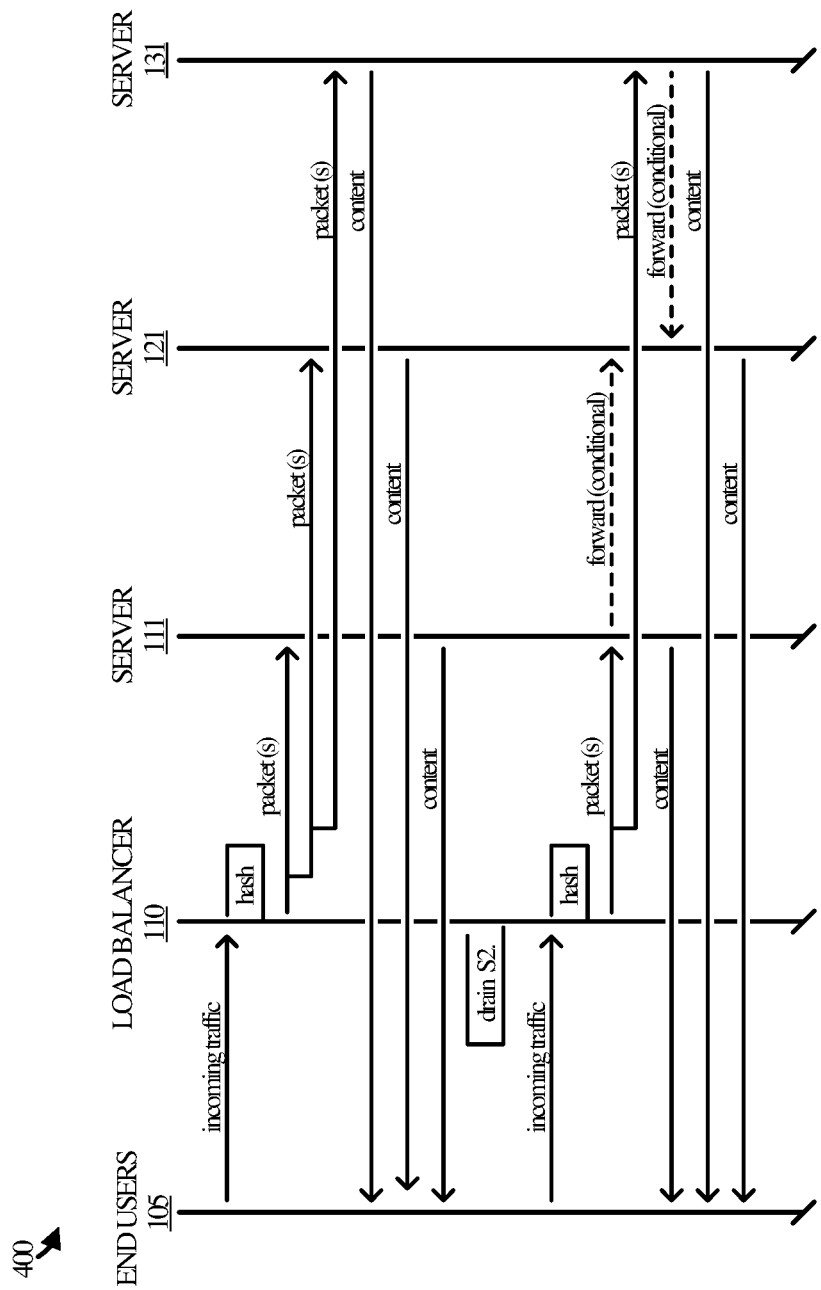
FIG. 4 illustrates an operational sequence in an implementation.

Operational scenario 400 in FIG. 4 further demonstrates the principles of packet redirect as contemplated herein and largely tracks the example provided in FIGS. 3A-3B.

In operation, end users 105 communicate packet traffic to load balancer 110. Load balancer 110 applies a hash algorithm or some other technique to determine where to route the individual packets in the traffic. Some of the traffic is sent to server 111, while some is sent to server 121, and some is sent to server 131.

The servers 111, 121, and 131 generally reply to requests that may be included in the packets. This may involve, for example, establishing a connection with a given end user and sending content over the connection to the end user. The content may have been cached locally on a given server, may have been obtained from an origin server, or obtained from elsewhere.

At any point in time, a decision may be made to drain traffic from one or more of the servers. In this example, load balancer 110 receives an instruction to drain traffic from server 121. This may happen in response to a failover event, a planned outage, or the like. Load balancer responsively shifts incoming traffic to server 111 and server 131 so that the load on server 121 can be reduced and/or eliminated.

However, there may remain ongoing connections between server 121 and end users. Load balancer 110 will distribute packets on those connections to server 111 and server 131, which may cause lost packets or delays as neither server will recognize the connections. To mitigate against such problems, the servers employ redirect process 200.

For example, a user space program in server 111 examines each incoming packet to ascertain whether or not the connection identified in the packet is new or known to it. If so, server 111 keeps the packet and processes it normally, which may include serving content to the end users that sent the packet. If not, the user space program in server 111 forwards the packet to server 121 for further processing.

Similarly, a user space program in server 131 examines each incoming packet to ascertain whether or not the connection identified in the packet is new or known to it. If so, server 131 keeps that packet and processes it normally. This may include replying to requests with content stored locally, obtained from an origin server, or the like. If not, the user space program sends the packet to server 121.

Server 121 may thus receive the packets sent to it in association with previously-established connections, while being drained of any new traffic. Server 121 can process the packets normally, which may include serving content to the end users that originated the packets in association with the previously-established connections.

Figure 5:
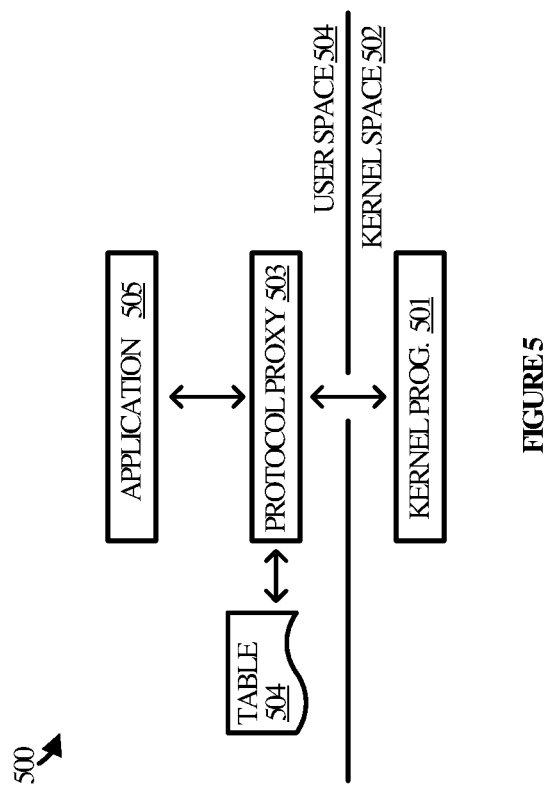
FIG. 5 illustrates a software architecture in an implementation.

FIG. 5 illustrates a software architecture 500 that may be employed in an implementation of user space packet redirect as contemplated herein. Software architecture 500 may be employed in any suitable physical or virtual computing system, of which computing system 701 is representative. Software architecture 500 includes kernel program 501 in kernel space 502 and protocol proxy 503 in user space 504. User space 504 also includes table 504 and application 505.

Kernel program 501 is broadly representative of any program code running in the kernel of a computing system that may be involved in handling incoming and outgoing packet traffic. Examples include, but are not limited to, any suitable networking protocols (e.g. layer 2 and layer 3 protocols) used to communicate with load balancers, servers, switches, routers, and other computing and communication elements.

Protocol proxy 503 is broadly representative of any program code running in the user space of a computing system that may be used to implement a transport layer protocol in user space. In some implementations, the transport layer protocol may be implemented in user space over the User Datagram Protocol (UDP). Examples include, but are not limited to, Quick UDP Internet Connections (QUIC).

Table 504 is representative of a data structure in which protocol proxy 503 may track the connections that are created and eliminated over the course of handling requests and serving content to end users. Protocol proxy 503 is capable of accessing table 504 in user space, although in some implementations, kernel program 501 may also be capable of accessing table 504 in user space.

Application 505 is representative of one or more software applications that may run in user space 504. Such an application may provide one or more services with respect to requests for content received by protocol proxy 503. Examples include, but are not limited to, firewall applications, caching applications, purging software, image optimization, and the like.

Figure 6A:
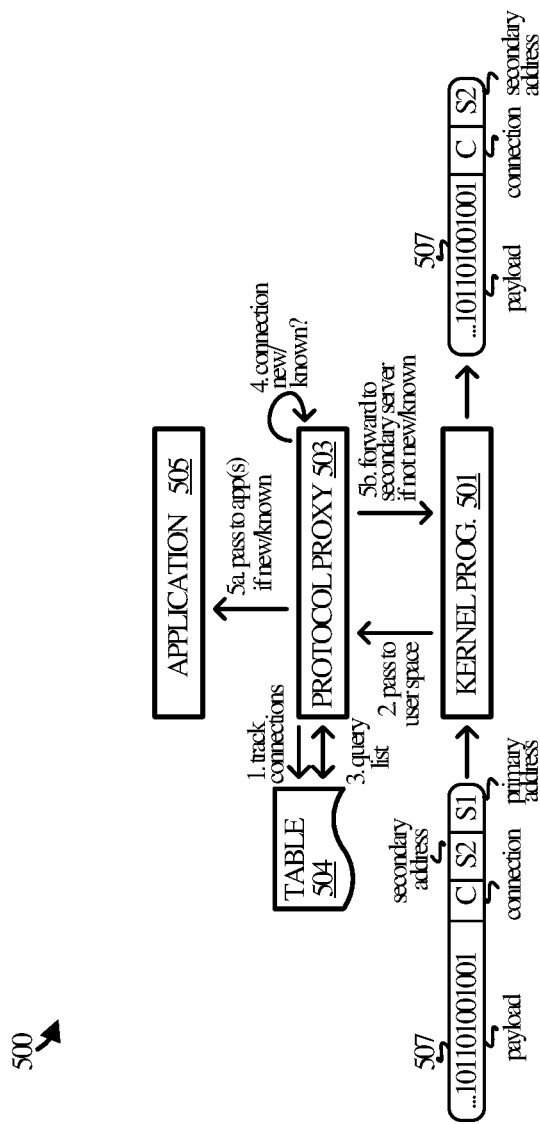
FIG. 6A illustrates an operational scenario in an implementation.
Figure 6B:
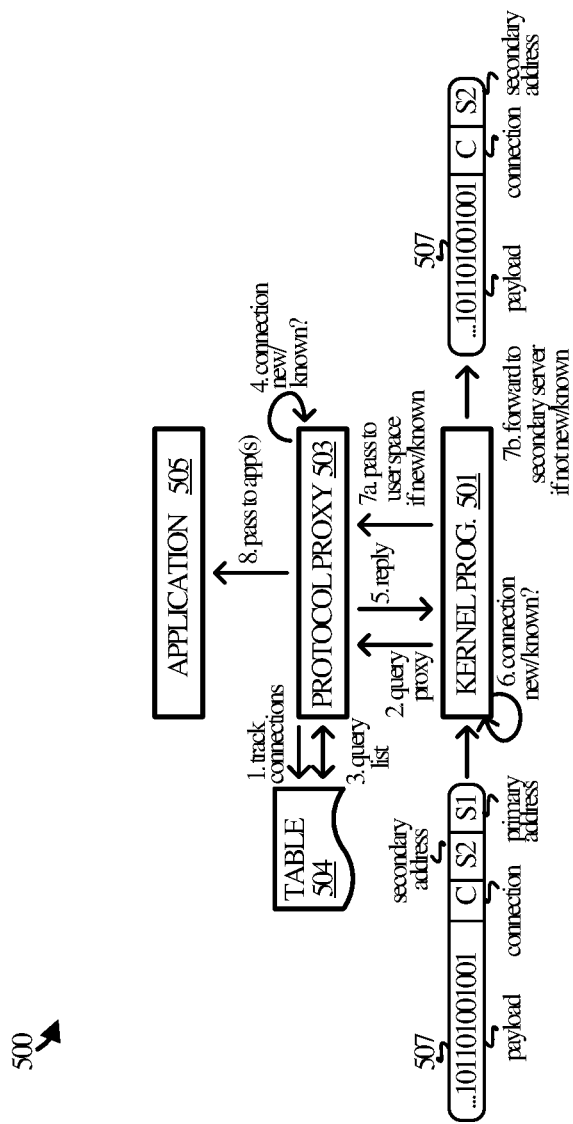
FIG. 6B illustrates an alternative operational scenario in an implementation.
Figure 6C:
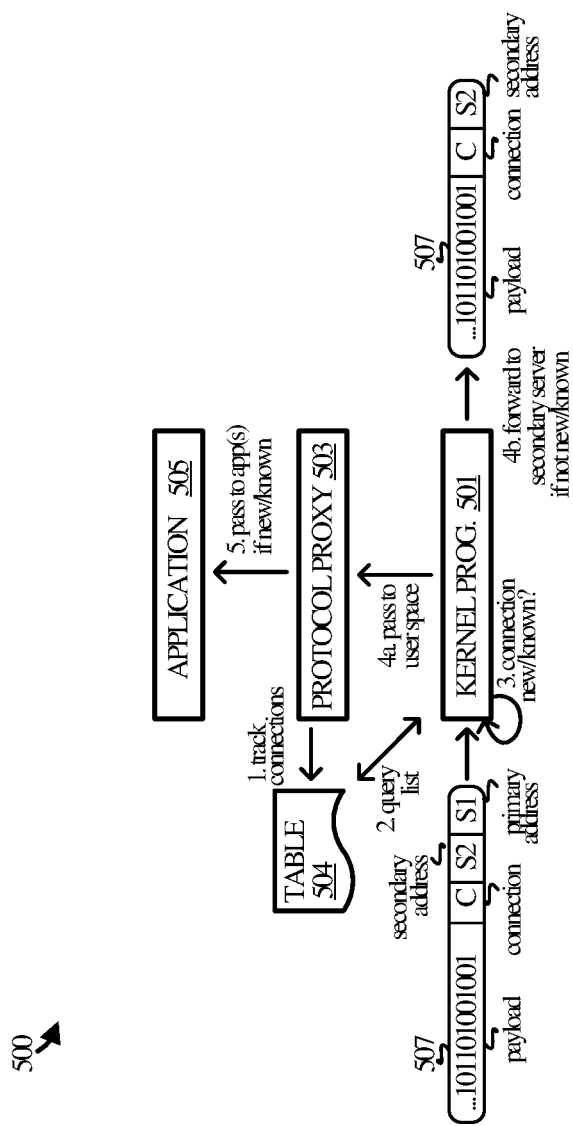
FIG. 6C illustrates an alternative operational scenario in an implementation.

FIGS. 6A-6C each illustrate a different operational scenario for implementing a packet redirect process as contemplated herein. FIG. 6A illustrates a technique dependent upon protocol proxy 503, whereas FIG. 6B and FIG. 6C illustrate techniques that utilize kernel program 501 for one or more of the steps.

Referring to FIG. 6A, kernel program 501 receives a packet 507 from a load balancer or other element in a physical or virtual network facility. The packet includes a primary address, a secondary address, a connection identifier, and a payload. Kernel program 501 passes the packet to protocol proxy 503 in user space. It may be appreciated that the kernel program 501 may strip the packet of one or more layers before doing so, or it may pass the entire packet to protocol proxy 503.

Protocol proxy 503 receives the packet and examines it for the connection identifier. Prior to receiving the traffic, it may be assumed that protocol proxy 503 had been tracking the connections that it had established with end users. As such, protocol proxy 503 is able to look in table 504 for the presence of a connection that matches the connection identifier in the packet 507. Protocol proxy 503 may also determine whether the connection is a new connection, as opposed to a known connection.

If the connection is new or known, protocol proxy 503 passes the packet to application 505 for further processing. However, if the connection is neither new nor known to protocol proxy 503, it forwards the packet to the secondary server identified in the packet. The secondary server may be identified by an address, such as a media access control (MAC) address, an alias that may be translated into an address, or by any other suitable mechanism.

Protocol proxy 503 may call kernel program 501 in order to forward the packet. Alternatively, protocol proxy 503 could call some other program in kernel space 502 to send the packet. In yet another alternative, protocol proxy 503 may be capable of bypassing kernel space 502 and sending the packet itself. Packet 507 in its outgoing form includes the same payload and connection identifier and is addressed to the secondary server. In an example, the packet 507 may be forwarded over an Ethernet network to the secondary server utilizing the MAC address of the secondary server. The secondary server may then respond to any request that may be included in packet 507.

In FIG. 6B, kernel program 501 receives packet 507 from a load balancer or other element in a physical or virtual network facility. The packet again includes a primary address, a secondary address, a connection identifier, and a payload. Kernel program 501 queries protocol proxy 503 with the connection identifier to determine if it is new or known to the proxy. Protocol proxy 503 searches table 504 for a matching identifier to determine if the connection is known. Protocol proxy 503 may also determine whether the connection is new (if it isn't known). The connection may be considered new based on the context of the payload, such as whether it is requesting a new connection from protocol proxy 503.

Protocol proxy 503 replies to kernel program 501 with the answer to its query—that is, whether the connection is one of new/known or not-known to the proxy. If the connection is new/known, then kernel program 501 passes the packet 507 to protocol proxy 503. Protocol proxy 503 may process the packet and may also pass it up to application 505.

If the connection is neither new nor known to protocol proxy 503, kernel program 501 forwards the packet to the secondary server identified in the packet. The secondary server may be identified by a network address, MAC address, an alias that may be translated into an address, or by any other suitable means. The secondary server may then respond to any request that may be included in the packet 507.

In FIG. 6CB, kernel program 501 receives packet 507 from a load balancer or other element in a physical or virtual network facility. The packet again includes a primary address, a secondary address, a connection identifier, and a payload. Kernel program 501 accesses table 504 to determine if it is new or known to the proxy. Kernel program 501 searches table 504 for a matching identifier to determine if the connection is known. Kernel program 501 may also determine whether the connection is new if it isn't known. The connection may be considered new based on the context of the payload, such as whether it is requesting a new connection from protocol proxy 503.

If the connection is new or known to the proxy, kernel program 501 passes the packet 507 to protocol proxy 503. Protocol proxy 503 may further process the packet and passes the packet to application 505. If the connection is neither new nor known to protocol proxy 503, kernel program 501 forwards the packet to the secondary server identified in the packet. The secondary server may be identified by a network address, MAC address, an alias that may be translated into an address, or by any other suitable means. The secondary server may then respond to any request that may be included in the packet 507.

FIG. 7 illustrates computing system 701 that is representative of any system or collection of systems in which the various processes, programs, services, and scenarios disclosed herein may be implemented. Examples of computing system 701 include, but are not limited to, server computers, web servers, cloud computing platforms, and data center equipment, as well as any other type of physical or virtual server machine, container, and any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements redirect process 706, which is representative of the redirect processes discussed with respect to the preceding Figures. When executed by processing system 702 to provide packet redirection in user space, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including redirect process 706) may be implemented in program instructions and among other functions may, when executed by processing system 702, direct processing system 702 to operate as described with respect to the various operational scenarios, sequences, and processes illustrated herein. For example, software 705 may include program instructions for implementing a redirect process to redirect packet traffic as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to provide packet redirection. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a server in an infrastructure service, the method comprising:
   receiving a packet from a stateless load balancer in the infrastructure service, wherein the packet comprises a request for content;
   in a user space program on the server, determining whether a connection identified in the packet belongs to the server;
   in the user space program, handling the request for the content if the connection belongs to the server; and
   forwarding the packet from the server to a secondary server in the infrastructure service if the connection does not belong to the server.

2. The method of claim 1 wherein the connection identified in the packet is determined to belong the server is the connection is new or already known to the user space program.

3. The method of claim 2 wherein the user space program operates in accordance with a transport layer network protocol and maintains a list of existing connections.

4. The method of claim 3 wherein determining whether the connection belongs to the server comprises checking the list of existing connections for the connection.

5. The method of claim 4 wherein the transport layer network protocol comprises QUIC (Quick UDP [User Datagram Protocol] Internet Connections) and wherein the connection comprises a QUIC connection.

6. The method of claim 1 wherein the secondary server is identified in the packet and wherein forwarding the packet from the server to the secondary server comprises sending the packet to a media access control (MAC) address for the secondary server.

7. The method of claim 1 wherein handling the request for the content comprises:
   determining if the content is cached in the server;
   obtaining the content from an origin server if the content is not yet cached; and
   replying to the request with the content.

8. A server computer comprising:
   one or more computer readable storage media;
   a processing system operatively coupled with the one or more computer readable storage media; and
   program instructions stored on the one or more computer readable storage media and executed by the processing system, wherein the program instructions comprise:
   a kernel space program configured to at least receive packet traffic from a stateless load balancer in an infrastructure service;
   a user space program on the server configured to at least: determine whether a connection identified in the packet traffic belongs to the user space program; keep the packet traffic if the connection belongs to the user space program; and forward the packet traffic from a secondary server computer in the infrastructure service if the connection does not belong to the user space program.

9. The server computer of claim 8 wherein the connection identified in the packet is determined to belong the server is the connection is new or already known to the user space program.

10. The server computer of claim 9 wherein the user space program operates in accordance with a transport layer network protocol and maintains a list of existing connections.

11. The server computer of claim 10 wherein user space program checks the list of existing connections to determine whether the connection belongs to the user space program.

12. The server computer of claim 11 wherein the transport layer network protocol comprises QUIC (Quick UDP [User Datagram Protocol] Internet Connections) and wherein the connection comprises a QUIC connection.

13. The server computer of claim 8 wherein the secondary server computer is identified in the packet traffic and wherein forwarding the packet traffic from the server computer to the secondary server computer comprises sending the packet to a media access control (MAC) address for the secondary server computer.

14. The server computer of claim method of claim 8 wherein, in response to keeping the packet traffic, the server computer is further configured to:
   determine if a content requested by the packet traffic is cached in the server;
   obtain the content from an origin server if the content is not yet cached; and
   reply to the packet traffic with the content.

15. A method of operating a content delivery network, the method comprising:
   in a load balancer, receiving packet traffic from end user applications;
   in the load balancer, distributing the packet traffic across a plurality of servers in the content delivery network;
   in response to an instruction to drain the packet traffic from a one of the plurality of servers, redirect the packet traffic from the one of the plurality of servers to at least one other of the plurality of servers;
   in a user space application of the one other of the plurality of servers:
   receiving a packet from the load balancer;
   determining whether a connection identified in the packet belongs to the one other of the plurality of servers;
   sending the packet to the one of the plurality of servers if the connection does not belong to the one other of the plurality of servers; and
   serving content requested by the packet if the connection belongs to the one other of the plurality of servers.

16. The method of claim 15 wherein the connection identified in the packet is determined to belong to the one other of the plurality of servers if the connection is new or already known to the user space application.

17. The method of claim 16 wherein the user space program operates in accordance with a transport layer network protocol and maintains a list of existing connections.

18. The method of claim 17 wherein determining whether the connection belongs to the one other of the plurality of servers comprises checking the list of existing connections for the connection.

19. The method of claim 18 wherein the transport layer network protocol comprises QUIC (Quick UDP [User Datagram Protocol] Internet Connections) and wherein the connection comprises a QUIC connection.

20. The method of claim 15 wherein the one of the plurality of servers is identified in the packet and wherein sending the packet to the one of the plurality of servers comprises directing the packet to a media access control (MAC) address for the one of the plurality of servers.

* * * * *